United States Patent [19]

Greiner

[11] Patent Number: 4,776,315

[45] Date of Patent: Oct. 11, 1988

[54] ARRANGEMENT FOR FEEDING OF FUEL FROM A SUPPLY TANK TO AN INTERNAL COMBUSTION ENGINE, PARTICULARLY OF A POWER VEHICLE

[75] Inventor: Max Greiner, Gerlingen, Fed. Rep. of Germany

[73] Assignee: Robert Bosch GmbH, Stuttgart, Fed. Rep. of Germany

[21] Appl. No.: 114,875

[22] Filed: Oct. 28, 1987

[30] Foreign Application Priority Data

Feb. 11, 1987 [DE] Fed. Rep. of Germany ....... 3704191

[51] Int. Cl.⁴ ............................................. F02M 39/00
[52] U.S. Cl. ................................ 123/509; 123/198 D; 123/510; 417/40
[58] Field of Search ........... 123/510, 509, 514, 198 D, 123/497; 417/368, 40

[56] References Cited

U.S. PATENT DOCUMENTS

| 2,445,069 | 7/1948 | Johnson | 417/40 |
| 4,019,485 | 4/1977 | Cartmill | 123/198 D |
| 4,166,717 | 9/1979 | Debbrey | 417/40 |
| 4,205,648 | 6/1980 | Graham | 123/497 |
| 4,208,171 | 6/1980 | Jonsson | 417/368 |
| 4,651,701 | 3/1987 | Weaver | 123/509 |
| 4,672,937 | 6/1987 | Fales | 123/509 |

FOREIGN PATENT DOCUMENTS

| 2844053 | 4/1980 | Fed. Rep. of Germany | 123/509 |
| 0875112 | 10/1981 | U.S.S.R. | 123/198 D |

Primary Examiner—Carl Stuart Miller
Attorney, Agent, or Firm—Michael J. Striker

[57] ABSTRACT

An arrangement for supplying fuel from a supply tank to an internal combustion engine, particularly in a power vehicle, comprises a container, a feeding aggregate arranged in the container, two pump stages arranged in series in a flow direction of a fuel and sealed from one another, the pump stages including a pre-stage and an end stage and each having a suction opening and a pressure opening, and unit for warning about the dry running of the pre-stage and including a sensor which is arranged between the suction opening and the pressure opening of the pre-stage in a region of the feeding aggregate through which fuel flows, and a warning device operatively connected with the sensor and activated in response to dry running of the pre-stage.

4 Claims, 1 Drawing Sheet

U.S. Patent  Oct. 11, 1988  4,776,315
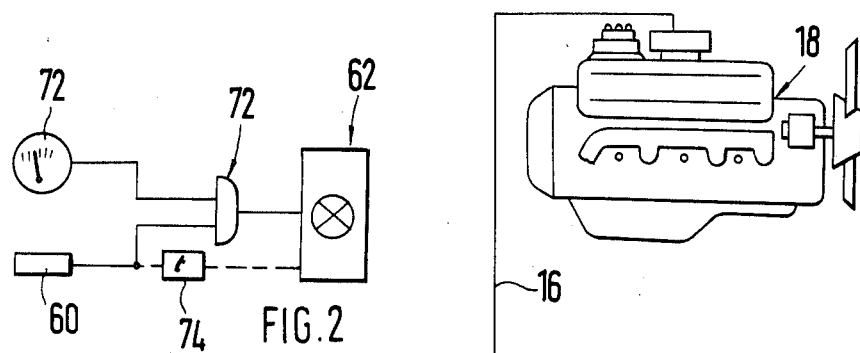
FIG.2
FIG.1
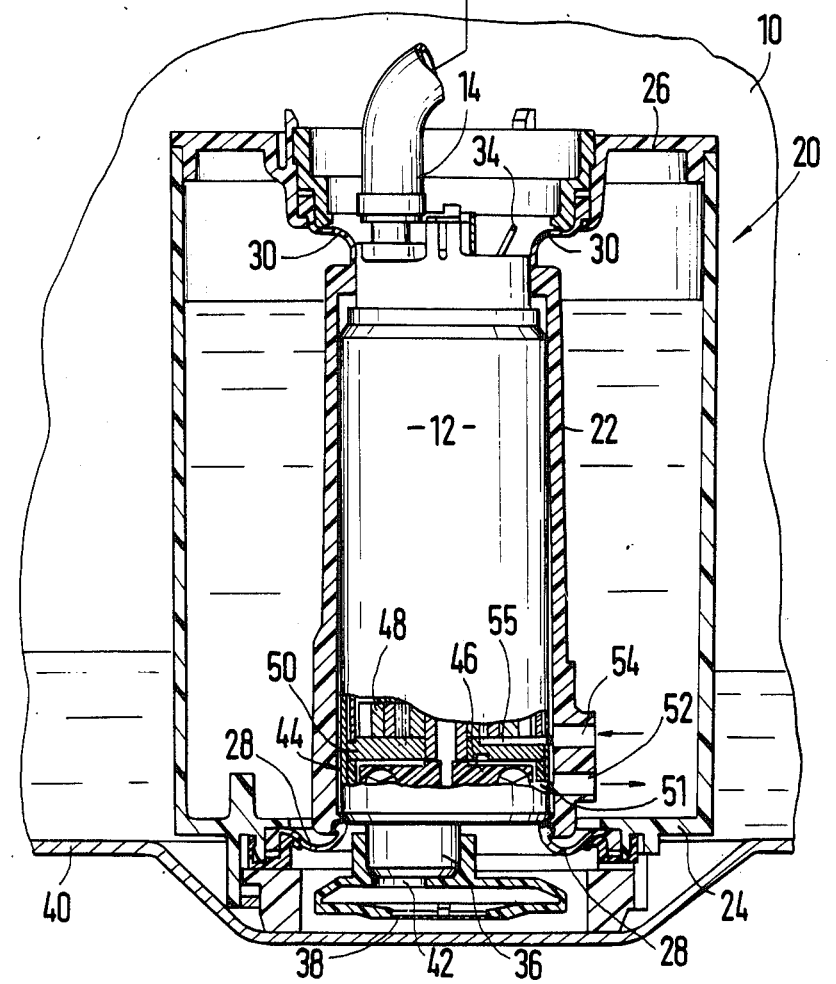

4,776,315

ARRANGEMENT FOR FEEDING OF FUEL FROM A SUPPLY TANK TO AN INTERNAL COMBUSTION ENGINE, PARTICULARLY OF A POWER VEHICLE

BACKGROUND OF THE INVENTION

The present invention relates to an arrangement for feeding of fuel from a supply tank to an internal combustion engine, particularly in a power vehicle.

More particularly, it relates to such an arrangement which has a feeding aggregate which is held for example in a cup-shaped container and provided with two pump stages which are arranged in series in a flow direction of the fuel and sealed from one another relative to the fuel.

Arrangements of the above mentioned general type are known in the art. One such arrangement is disclosed in the German document DE-OS No. 3,532,342. In this arrangement the container can be emptied without special warning so that the driver of the power vehicle is informed about the availability of fuel only by a conventional relatively inaccurate tank filling indicator. It is believed that such an arrangement has some disadvantages which can be eliminated so that the information provided to the driver can be improved.

SUMMARY OF THE INVENTION

Accordingly, it is an object of the present invention to provide an arrangement for feeding fuel from a supply tank to an internal combustion engine, particlarly in a power vehicle, which avoids the disadvantages of the prior art.

More particularly, it is an object of the present invention to provide an arrangement or feeding of fuel from a supply tank to an internal combustion engine, particularly in a power vehicle, which has the advantage that the driver immediately receives reliable indication that the supply tank no longer has any fuel. It can, however, start in one tank position with residual fuel quantity which is available and known to him.

In keeping with these objects and with others which will become apparent hereinafter, one feature of the present invention resides, briefly stated, in an arrangement for feeding of fuel from a supply tank to an internal combustion engine, particularly a power vehicle in which warning means is provided for warning about dry running of the pre-stage of the feeding aggregate wherein the warning means includes a sensor arranged between a suction opening and a pressure opening of the pre-stage, and a warning device which is in operative communication with the sensor and is activated when the pre-stage runs dry.

In accordance with another feature of the present invention the sensor of the warning means is formed as a pressure sensor.

In accordance with still another especially advantageous feature of the present invention the sensor is coupled with an indicating device which measures the contents of the supply tank. Therefore the warning device is not activated when the pre-stage of the feeding aggregate runs dry over a short time when the supply tank is only partially filled and when the power vehicle runs fast over a curve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view schematically showing an arrangement for feeding fuel from a supply tank to an internal combustion engine, in accordance with the present invention, partially in section taken through a supply tank and a fuel feeding aggregate arranged in it; and FIG. 2 is a view showing a circuit associated with the inventive arrangement for feeding of fuel.

DESCRIPTION OF A PREFERRED EMBODIMENT

A fuel supply arrangement in accordance with the present invention shown in FIG. 1 has a supply tank 10 and a fuel feeding aggregate 12 arranged in the tank. The fuel feeding aggregate 12 has a pressure pipe 14 which is connected with a pressure conduit 16 leading to an internal combustion engine 18. During the operation of the internal combustion engine 18, the fuel feeding aggregate 12 feeds fuel from the supply tank 10 to the internal combustion engine 18.

The fuel feeding aggregate 12 is arranged in a cup-shaped container 20 which is located inside the fuel supply tank 10. The container 20 is provided with a holder 22 for the fuel feeding aggregate 12. The tubular ends of the holder 22 face toward a container bottom 24 and a container cover 26, respectively. Hose-like damping and/or sealing elements 28 and 30 extend from the container bottom 24 and from the container cover 26 toward the inwardly facing tubular ends of the holder 22. Both the container bottom 24 and the container cover 26 are interrupted in the region of the hose-like elements 28 and 30 so that connecting elements 34 located in the region of the container cover 26 and being a part of a not shown electric drive motor for the feeding aggregate 12 are freely accessible. A suction pipe 36 of the feeding aggregate 12 extends through the opening in the container bottom 24 and is provided with a filter 38. The container bottom 24 faces toward a tank bottom 40, so that a suction opening 42 of suction pipe 36 is located near the tank bottom 40.

The not shown electrical drive motor of the feeding aggregate 12 drives a two-stage supply pump 44 which is a component of the feeding aggregate. The supply pump 44 has two stages 46 and 48 which are sealed relative to one another by an intermediate plate 50 with respect to fuel which flows to the supply pump. The first pump stage 46 is directly connected with the suction opening 42 which opens into the supply tank 10. A pressure opening 51 of a pre-stage 46 which is formed as a lateral passage pump, opens into the container 20. The holder 22 also has a respective cutout 52. A second cutout 54 is located near the cutout 52 in the holder 22 and communicates a suction opening 55 of the second pump stage 48 with the interior of the container 20. The second pump stage 48 is formed in the shown example as a gear pump. It forms the end or pressure stage of the supply pump 44, whose pressure opening is formed on the pressure pipe 14 connected with the pressure conduit 16.

The fuel to be supplied flows in a known manner completely through the pressure feeding aggregate 12. In the region of the feeding aggregate through which the fuel flows, a sensor 30 formed as a pressure switch, a flow monitor or the like is arranged between the suction opening 42 and the pressure opening 51 of the pre-stage 46. The sensor 60 which is shown in FIG. 2 is so selected and arranged in working communication with a warning device 62, that the warning device 62 is activated when the pre-stage 46 runs dry. Under dry running it is understood in this connection that the suction opening 42 is no longer immersed into the fuel located in the supply tank 10 so that pre-stage 46 no longer supplies fuel from the supply tank to the container 20.

The operation of the supply arrangement in condition of different filling conditions of the supply tank 10 is described hereinabove. When the supply container is filled, the feeding aggregate 12 aspirates fuel through the fuel filter 38 and then through the suction opening 42 and pumps it through the pressure opening 51 into the container 20. The sensor 60 which lies in the region of the supply stream produced by the pre-stage 46 determines that the pre-stage operates and therefore the container 20 is filled with fuel. The pressure or end stage 48 of the feeding aggregate 12 aspirates fuel from the container 20 through the suction opening 55 located near the container bottom 24 and pumps the fuel through the pressure pipe 14 into the pressure opening 16 so that the internal combustion engine 18 is supplied with fuel. When, however, the fuel supply tank 10 is emptied so that the suction opening 42 of the pre-stage 46 no longer is in the fuel, the pressure in the region of the pre-stage 46 and in the associated passages drops. This is registered by the sensor 60 so that the warning device 62 is activated.

For preventing activation of the warning device 62 with a partially filled tank and during fast travel on a curve of the power vehicle when the residual fuel quantity in the supply tank 10 is pressed through the side because of the centrifugal force and the suction opening 42 of the pre-stage 46 is exposed, the pulse of the sensor 60 is combined through an AND-member 70 with an information which comes from the fuel container-filling quantity indicating device 72 and supplied to the warning device 62. The warning device is then activated only when the sensor 60 opens into a pressureless pre-stage 46 and moreover the indicating device 72 is informed about an empty fuel supply tank 10.

Alternatingly, it is also possible to introduce a time element 74 into the circuit of FIG. 2. The time element 74 transmits the pulse coming from the sensor 60, to the warning 62 only after a predetermined time period. Thereby the AND-member 70 and the information flow from the indicating device 72 can be dispensed with.

It will be understood that each of the elements described above, or two or more together, may also find a useful application in other types of constructions differing from the types described above.

While the invention has been illustrated and described as embodied in an arrangement for supplying fuel from a supply tank to an internal combustion engine, particularly of a power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for supplying fuel from a supply tank to an internal combustion engine, particularly in a power vehicle, the arrangement comprising a container; a feeding aggregate arranged in said container; two pump stages arranged in series in a flow direction of a fuel and sealed from one another, said pump stages including a pre-stage and an end stage and each having a suction opening and a pressure opening, said suction opening of said pre-stage being openable into a supply tank while said suction opening and said pressure opening of said end-stage are located in said container; and means for warning about a dry running of said pre-stage and including a sensor which is arranged between said suction opening and said pressure opening of said pre-stage in a region of the feeding aggregrate through which fuel flows, and a warning device operatively connected with said sensor and activated in response to a dry running of said pre-stage, said sensor of said warning means being formed as a pressure sensor.

2. An arrangement as defined in claim 1; and further comprising indicating device arranged to measure a supply tank content and coupled with said sensor of said warning means.

3. An arrangement as defined in claim 1; and further comprising a time member arranged to provide the operative connection between said sensor and said warning device of said warning means.

4. An arrangement as defined in claim 1, wherein said pre-stage has a pump chamber, said sensor of said warning means being arranged in said pump chamber of said pre-stage.

* * * * *